D. N. COLLUM.
CORN PLANTER.
APPLICATION FILED AUG. 18, 1914.
1,197,608.
Patented Sept. 12, 1916.
3 SHEETS—SHEET 1.
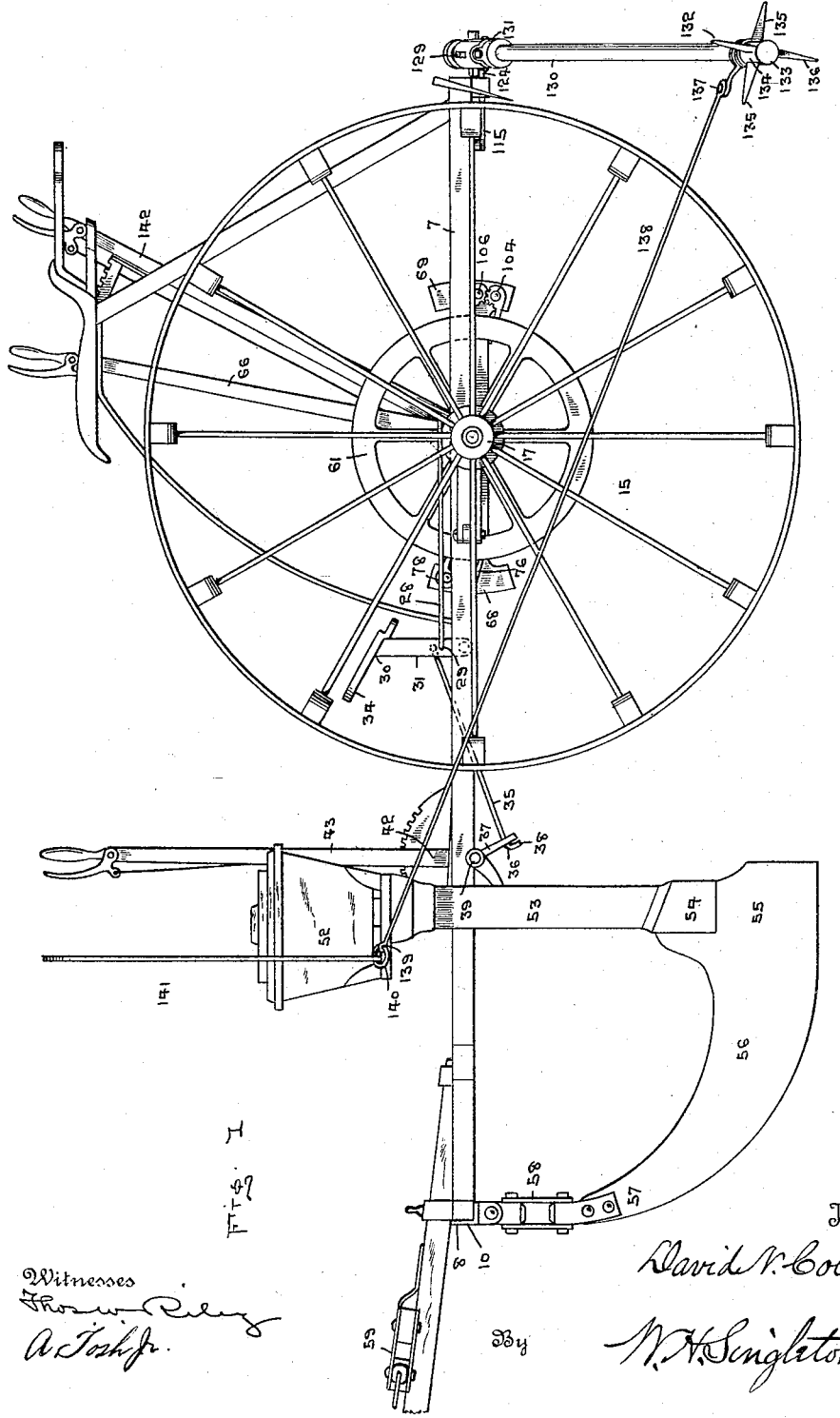

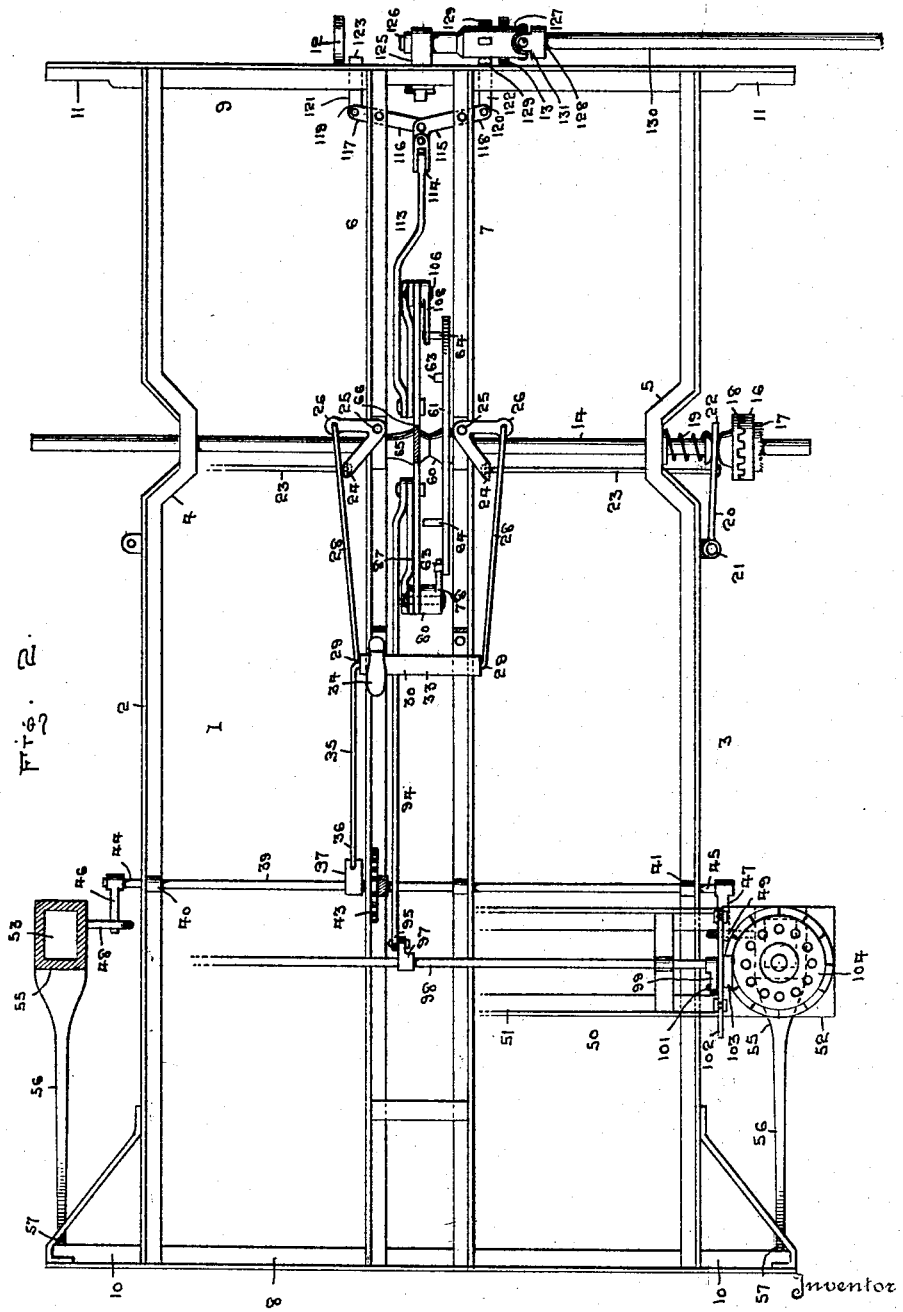

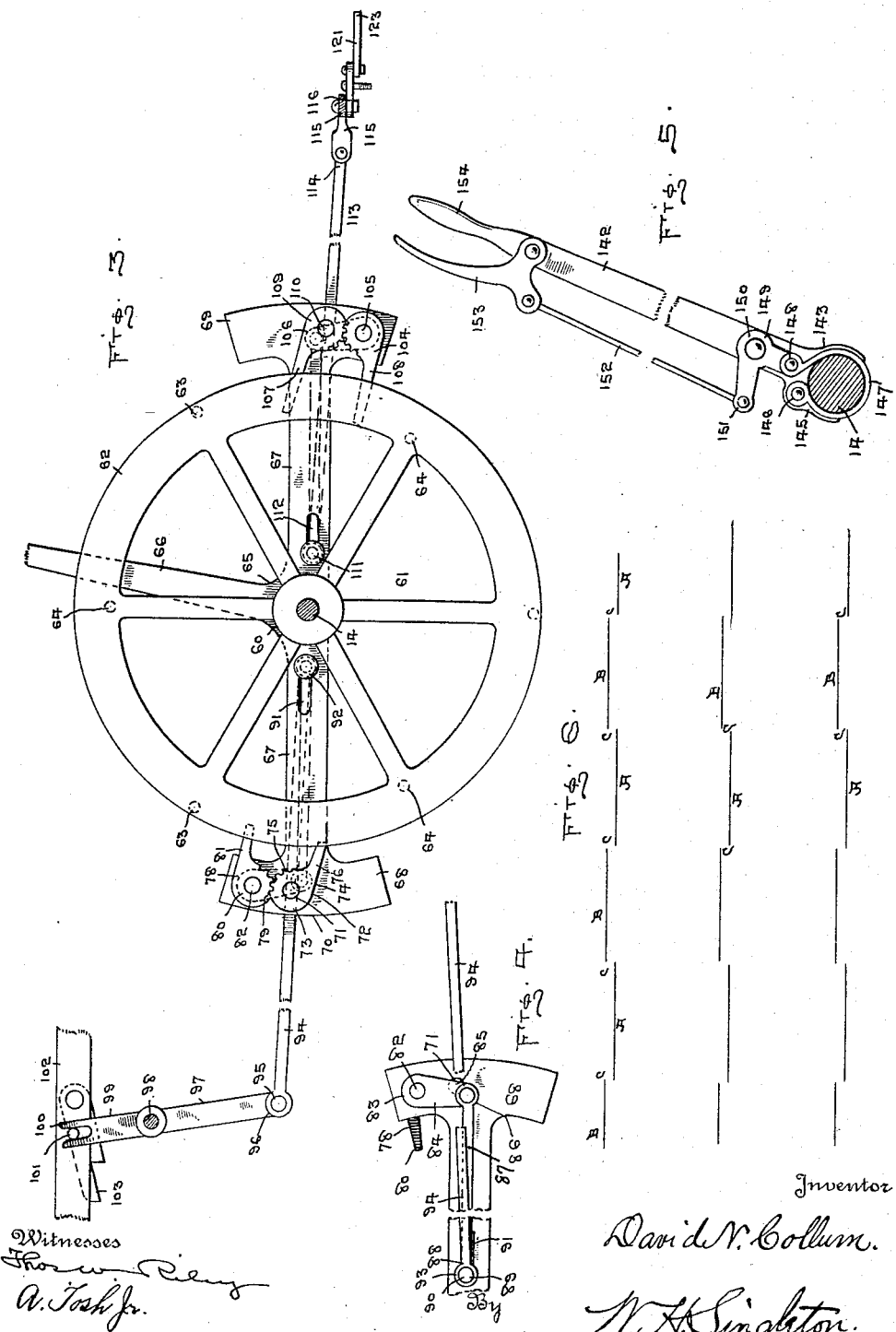

UNITED STATES PATENT OFFICE.

DAVID N. COLLUM, OF GARY, INDIANA.

CORN-PLANTER.

1,197,608.

Specification of Letters Patent.   Patented Sept. 12, 1916.

Application filed August 18, 1914. Serial No. 857,228.

*To all whom it may concern:*

Be it known that I, DAVID N. COLLUM, a citizen of the United States, residing at Gary, in the county of Lake and State of Indiana, have invented certain new and useful Improvements in Corn-Planters, of which the following is a specification.

This invention relates to a new and useful improvement in corn planters.

The object of the invention is to produce a corn planter which will be "wireless;" will form a distinct mark for guiding the direction of the planter and also will mark the place where corn is to be dropped; will adjust the dropping of the corn at a predetermined place; and generally to produce a corn planter which shall operate with ease and precision.

The invention consists in a corn planter provided with means for forming a distinct guiding mark readily perceived and also for indicating at regular intervals the place where corn is to be dropped.

The invention further consists in a corn planter provided with a check row device which both indicates the line of travel of the corn planter and also the place where corn is to be dropped.

The invention further consists in details of construction hereinafter pointed out.

In the annexed drawings: Figure 1 is a side view of a corn planter provided with the invention. Fig. 2 is a plan view of a portion of the corn planter provided with the invention. Fig. 3 is an enlarged detail view of a part of the device taken on a longitudinal line through the device. Fig. 4 is a side view of one end of the oscillating frame and connected parts. Fig. 5 is a modification. Fig. 6 is a diagrammatic view of the marks made by the device.

In these drawings: The numeral 1 designates the frame of the corn planter having the longitudinal side bars 2 and 3 with inward bends 4 and 5 opposite each other, longitudinal middle bars 6 and 7 spaced apart, and, fastened to these bars 6 and 7, front and rear end bars 8 and 9 with ends 10 and 11 projecting beyond the side bars 2 and 3. The rear end bar 9 has projecting downwardly from the back thereof two vertical hooks 12 and 13 spaced apart, the hooked ends extending upwardly. The bars 6 and 7 are connected to the rear bar 9 between the two hooks 12 and 13. Held in suitable bearings in the longitudinal bars 4, 5 6 and 7 across the corn planter in line with the bends 4 and 5 is the axle 14. On this axle 14 are loosely placed the wheels 15, one of which is seen in Fig. 1. The inner ends 16 of the hubs 17 of these wheels 15 are constructed to be engaged by clutches 18 adapted to slide lengthwise upon but to turn with the axle 14. The clutches 18 are held in engagement with the hubs 17 by springs 19 surrounding the axle 14 and bearing between the inner ends of the clutches 18 and the side bars 4 and 5. Bars 20 have one end 21 pivoted to the side bars of the corn planter and the other end 22 has sliding engagement with the clutches 18. Rod 23 connects the bars 20 with the arms 24 of bell-crank levers 25 pivoted to the middle longitudinal bars 6 and 7 and the other arms 26 of the bell-crank levers 25 have connected to them the ends of the rods 28. The other ends 29 of the rods 28 are connected to a frame 30 in front of the axle 14. The sides 31 and 32 of this frame 30 are pivoted to the bars 6 and 7 and the top 33 of this frame 30 extends across and above the bars 6 and 7 and may have a foot rest 34, secured to its top. Extending forwardly from the frame 30 is a rod 35, the front end 36 of which passes loosely through a hole in a plate 37 and has a hook 38 in front of the plate. This plate 37 is rigidly secured to a transverse rocking bar 39 held in bearings 40 and 41 in the bars 4 and 5. To this bar 39 is fastened at a convenient place the lower end 42 of a vertical operative lever 43 provided with an ordinary locking pawl attachment to engage the rack secured to the corn planter. To the outer ends 44 and 45 of the rod 39 are fastened fingers 46 and 47 which extend forwardly and come under rods 48 and 49 extending inwardly from the dropper frame 50. This dropper frame 50 has the cross bridge 51 which is secured at its ends to the boxes 52 from which extend downwardly the chutes 53 for conveying corn from the boxes 52 to the hills. The bottoms 54 of these chutes 53 are fastened to the rear ends 55 of the shoes 56. The front ends 57 of these shoes 56 are held laterally by swinging links 58 to the ends 10 of the front bar 8, to which the tongue 59 is rigidly fastened.

Secured to the axle 14 between the middle bars 6 and 7 is the hub 60 of a wheel 61. This wheel 61 has projecting from it at or near its periphery 62, two sets of pins 63 and 64 properly spaced apart. The pins of one set 63 are shorter than the pins of the other set 64 and are nearer the edge of the periphery 62 of the wheel 61. The pins of each set are the same distance from the center of the wheel 61. Also between the middle bars and upon the axle 14 alongside of the wheel 61 there is loosely held an oscillating frame 65 having an operating lever 66 provided with the usual rack and pawl, and the frame 65 has arms 67 provided with heads 68 and 69. From the side 70 of the head 68 projects a post 71 on which is placed the hub 73 of a tappet 74 having on top the teeth 75 and the rearwardly extending arm 76. Above this tappet 74 there is another tappet 78 having teeth 79 which mesh with the teeth 75 of the tappet 74. This tappet 78 has a hub 80 with the teeth 79 and rearwardly extending arm 81 longer than the arm 76. The hub 80 is fastened to a journal 82 which passes loosely through the head 68 and on the other side of this head is fastened to one end 83 of a link 84. The other end 85 of this link 84 is loosely fastened to one end 86 of a connecting rod 87, the other end 88 of which is fastened to the end 89 of a pin 90 which passes through a slot 91 in the front arm 67 of the oscillating frame 66 and has a head 92 on the other side of this arm 67. Also fastened to this end 89 of the pin 90 is the rear end 93 of another connecting rod 94 which extends forwardly and its front end 95 is loosely fastened to the lower end 96 of an arm 97 rigidly fastened to a rod 98 passing across the corn planter in line with the boxes 52. This rod 98 has rigidly fastened to its ends the crank arms 99. These arms 99 have at their outer ends the forks 100 which engage pins 101 secured to horizontal slides 102. To these slides 102 are pivoted dogs 103 which move in the usual way the rotary bottom plates 104, regulating dropping the corn. At the rear end 69 of the oscillating frame 66 there is a construction similar to that at the front end 68. The tappet 104 is on a stud 105. The meshing tappet 106 has an arm 107 longer than the arm 108 of the tappet 104. The hubs of the tappets 104 and 105 are shorter than the hubs of the tappets 74 and 78 as indicated in Fig. 2. The hub 109 of the tappet 106 is on a journal 110 which passes through the head 69 and has a link and rod connection with the pin 111 passing through the slot 112 in the rear arm 67 of the oscillating frame 66. From this pin 111, there extends rearwardly a connecting rod 113. At its rear end 114 this connecting rod 113 is loosely connected to a link 115 of a pair of links 115 and 116 hinged together by a joint. These links 115 and 116 pass through the bars 6 and 7 in which the links are pivoted. To the outer ends 117 and 118 of these links 115 and 116 are loosely connected the front ends 119 and 120 of rods 121 and 122 which pass through the rear bar 9 of the corn planter, the rear ends 123 and 124 of these rods 121 and 122 projecting out back of this rear bar 9. Projecting rearwardly from the rear bar 9 between the two hooks 12 and 13 and midway between the ends of the middle bars 6 and 7 is a loop 125. This loop is swiveled in the rear bar 9 so that the loop may be revolved. In this loop is inserted and firmly held the inner end 126 of the head 127 of the marker rod 128. This head 127 has projecting radially from it in a ring a number of projections 129. The location of these projections 129 is such that when the marker rod 128 is placed so as to rest in either hook 12 or 13, these projections 129 will be in line with the ends 123 or 124 of the rods 121 and 122. To the outer end of this head 127, the stem 130 is connected by a joint 131. On the outer end 132 of the stem 130 there is fastened a marker head 133. This head 133 is composed of a hub 134 and a number of teeth 135 and 136. These teeth are placed so as to be in two lines around the hub 134. The teeth 135 are in one line and the teeth 136 are in another line. The teeth are pointed as shown in Fig. 1, and four in number being in pairs two in the same diameter. Secured to the outer end of the stem 130 is the end 137 of a stay rod 138, the other end 139 of which has a loose ring 140 which encircles an arch 141 passing over and secured across the corn planter near its front end.

In Fig. 5 is shown the details of a modification. The hand lever 142 has a fork 143 which rests upon the axle 14. To the lower end 145 of the lever 142, there is secured one end 146 of a strap 147. This strap passes under the axle 14, and the other end 148 of the strap 147 is fastened to an arm 149 of a bell-crank lever 150, pivoted to the hand lever 142. The other arm 151 of the bell-crank lever 150 is fastened to a rod 152, which is attached at its upper end to a hand grip 153 adjacent to the handle 154 of the hand lever 142. All the various handles and the frame 30 are in convenient location for the operator, when upon the seat of the corn planter.

Operation: The parts are in the position shown in Fig. 1. The marker rod rests in the hook 13 (Fig. 2) and the head 133 is ready to mark. The wheels are held by the clutches and are ready to impart movement to the axle 14. As the corn planter is drawn forward the axle 14 turns, carrying with it the wheel 61. As a pin 63 strikes downwardly upon the arm 81 of the tappet 78, the tappet 78 turns and, through the journal 82, link 84, connecting rod 87, pin 90, connecting rod 94, arm 97, rod 98, crank arms 99, slides 102 and dogs 103, the rotary bottom plates 104 of the boxes 52 are moved one space, so as to bring the proper amount of corn over the chutes 53 and permit the corn to drop to the two hills. At the same time the tappet 78 meshing with the tappet 74 turns the arm 76 of the latter tappet upwardly. As the pin 63 passes off from the arm 81 of the tappet 78, this pin strikes the arm 76 of the tappet 74, swinging the tappet 74 downwardly and through the engaging teeth of the two tappets, turning the tappet 78 upwardly, reversing the movement of the parts and setting the dropping mechanism for another "feed." This action continues as the pins 63 continue to strike the arm 81 of the tappet 80. As the corn planter proceeds, a tooth, for instance 136, at the outer end of the marker rod traces a mark on the ground parallel to the line of travel of the corn planter. As the wheel 61 revolves one of the longer pins 64 strikes the arm 106 of the tappet 104 when a series of movements takes place similar to those when the pin 63 strikes the arm 81. Through the connecting rod 113 and the link 115, the rod 122 is withdrawn from engagement with one of the projections 129. As the marker rod 128 is thus released, the pressure at its outer end causes it to turn in the loop 125, until the pin 64, having passed the tappet 104, strikes the tappet 106 and, through the several parts forces the rod 122 outwardly when this rod 122 comes in contact with the next projection 129 and holds another tooth 135 into position for tracing a mark. As the teeth 135 are out of line with the teeth 136, the guiding marks made by these teeth will be like those shown diagrammatically in Fig. 6. They consist of a series of alternating short marks A and B, the marks of each series being in line, one with another, with breaks C between each two marks of a series. The linked connection between the shoes and the end bar 8 prevents the swaying from being communicated to the marker rod. And the joint 131 allows the stem 130 full play without affecting the head 127. There is produced a very distinct mark across the field which is a plain guide. After completing a stretch across the field, the operator turns and guides the team so that the tongue shall be moved along the lines formed by the teeth. At the same time the breaks in the lines indicate the places where corn is to be dropped. With such a mechanism, the operator is enabled to both drop the corn in parallel rows, and at the same time to place the hills across the rows in parallel lines. Should the operator notice that, from any cause, the dropping mechanism was going to act before the bottom of the chutes should reach the desired places, by moving the lever 66, he could oscillate the oscillating frame 65 so as to swing the front head 68 downwardly and thus move the tappet 78 farther from the pin 63. If dropping would not be soon enough, the head 68 could be swung farther upward. As the dropping device is thus affected, the movement of the parts will affect the rotation of the marking rod. The clutches may be released from the wheels by pressure of the feet on the frame 30 or by operating the hand lever 43, the latter acting through the connecting rod 35. When it is desired to turn the corn planter or to move it without its being operated, by using the hand lever 43, not only are the clutches released from the wheels but though the rocking bars 39, fingers 46, 47 and rods 48, 49, the boxes 52 and shoes 56 are lifted so that the corn planter may be moved without the shoes dragging. Thus by means of the hand lever 43 the clutches are released and the shoes lifted at one operation. When the device is to be moved and not to be operated, the marker arm is swung upwardly, the ring 140 moving over the arch 141.

In Fig. 5 is shown the modification which may be used to shift to wheel 61 rather than the oscillating frame 65, to adjust the dropping mechanism. Instead of moving the front end of the oscillating frame upward or downward, the lever 142 may be so operated as to bind its lower end on the axle 14 and then the latter be turned in the wheels so as to move the wheel 61 forward or backward and thus vary the stroke of the pins 63.

Having described my invention, what I claim is:

1. A corn planter with a single marker means, comprising a head provided with teeth in staggered formation, adapted to contact with the ground to make a guiding mark when the head is held against rotation during the travel of the corn planter, and means for allowing the head to rotate intermittently to break the marking line of the teeth to indicate the place for dropping corn.

2. A corn planter provided with a single rotatable marker rod, having a head carrying teeth in two sets, each set arranged in a separate line and adapted to operate alternately, mounted rotatably upon the frame of the corn planter and adapted to be extended on either side of it, and means for holding the marker rod in position and intermittently releasing it so that it may rotate.

3. A corn planter, having rotatably mounted thereon a single rotatable marker rod, having a head carrying teeth in two sets, each set arranged in a separate line and adapted to operate alternately, and having projections arranged in a ring, means for engaging such projections and means for releasing the engaging means, such releasing means comprising parts adapted to be adjusted in relation to each other, to vary the time of release.

4. In a corn planter, the combination of an axle, a wheel secured to the axle and provided with a series of pins, an oscillating frame loose on the axle, a tappet held in such frame and having an arm in the path of the pins, a rod connected to the tappet and a marker engaged by said rod, having a head carrying teeth in two sets, each set arranged in a separate line and adapted to operate alternately.

5. In a corn planter, the combination of the axle, a wheel secured to the axle and provided with a series of pins, an oscillating frame loose on the axle, two intermeshing tappets held in such frame, each having an arm in the path of the pins, a rod connected to one of the tappets and a marker engaged by said rod, having a head carrying teeth in two sets, each set arranged in a separate line and adapted to operate alternately.

In testimony whereof I affix my signature in presence of two witnesses.

DAVID N. COLLUM.

Witnesses:
S. W. COCKRELL,
W. H. SINGLETON.